United States Patent [19]

Fisher, Jr.

[11] Patent Number: 5,484,613
[45] Date of Patent: Jan. 16, 1996

[54] DEVICE FOR PREPARING SANDWICH MEAT

[76] Inventor: A. William Fisher, Jr., 67 Park St., Tenafly, N.J. 07670

[21] Appl. No.: 37,238
[22] Filed: Mar. 26, 1993
[51] Int. Cl.⁶ ..................................... H21D 10/02
[52] U.S. Cl. .................. 426/124; 426/121; 426/129; 426/420; 53/445; 53/474; 220/527; 220/528; 220/529
[58] Field of Search .................. 426/129, 124, 426/121, 420; 53/445, 474; 220/527–529

[56] References Cited

U.S. PATENT DOCUMENTS

| | | | |
|---|---|---|---|
| 1,646,147 | 10/1927 | Hoffman | 220/528 |
| 1,808,475 | 6/1931 | Oyen | 220/529 |
| 2,522,768 | 9/1950 | Wiedert | 220/528 |
| 4,538,737 | 9/1985 | Delaney | 220/529 |
| 4,854,464 | 8/1989 | Kim | 220/528 |
| 4,955,502 | 9/1990 | Sorci | 220/529 |

Primary Examiner—Ana M. Fortuna
Attorney, Agent, or Firm—Christopher D. Goodman

[57] ABSTRACT

The invention provides a container and a method which includes substantially encasing a long thin pile of meat in a separator sheet defining a meat packet. Meat packets filled with a similar meat or a preselected combination of meats are placed, on edge, in groups into a container. Rigid members are placed between groups of packets of similar meat packet type. The container has sides which define an angle. The rigid members have edges which define a similar angle such that the rigid members are kept from falling over in the container in a self-locking way. The method minimizes the tendency of the meat packets to sag in the container by pressing the meat packets against an end wall of the container via one of the rigid members thereby imparting stress to the meat packets. The self locking of the rigid members tend to maintain the stress. In addition the rigid members includes front and rear surfaces which have a surface texture such that the meat packets tends to cling to the front and back surfaces thereby further reducing the tendency of the meat packets to sag.

7 Claims, 4 Drawing Sheets

DEVICE FOR PREPARING SANDWICH MEAT

BACKGROUND OF THE INVENTION

1. Field of the Invention

The present invention relates generally to methods and devices for preparing sandwich meat, and in particular to an improved method and device in which a plurality of pre-measured packets of meats are kept in place, in proper order, and in an attractive state, by a plate member.

2. Background of the Invention

In order to save time during busy hours many sandwich restaurants regularly organize pre-sliced meats into pre-measured packets duping less busy, or during off hours. One method of organizing the meats is to place a selected number of meat slices on separator, sheets such as waxed paper, plastic cellophane or the like. With this method the first slice is placed flat. A second slice is placed on top of and partially overlapping the first slice. Additional slices are placed onto the slices previously placed overlapping the previously placed slices. The result is a long flat pile of meat. Substantially half of the separator sheet is left uncovered so that after the long pile is assembled the uncovered portion of the sheet is folded over onto the pile substantially sealing the meat in the sheet.

Meat packets of similar type are grouped together and placed on edge in a container with the longitudinal axes of the packets parallel to one another. A packet of similar type (for purposes of this application) is defined as: a long pile of meat used to make a certain type of sandwich sealed in the separator sheet as described. The groups are arranged in the container in a preselected order.

The container is placed into an opening defined at the top of a refrigerated work station. The work station usually contains a work surface along one edge. The container is placed such that the longitudinal axes of the packets are substantially parallel to an edge of the work sur face. The sandwich maker stands adjacent to, and prepares the sandwiches on, the work surface. The meats can be viewed from the top of the container.

When a customer orders a sandwich, a packet of the meat corresponding to the sandwich ordered is removed from the container. The packet is selected from the packet group in the container determined by the preselected order of the meat packet groups.

The close proximity of the packet groups makes it difficult to tell when a certain type of packet is about to, or has, run out. This of course is a problem when the sandwich maker is caught unprepared for a customer who orders a certain sandwich, and the appropriate meat, or appropriate meat packet type, cannot be found in the container.

One known method to aid the sandwich maker in determining the availability of each type of meat, and also for selecting the right packet, is to provide a key, or list, of the sandwich names corresponding to the preselected order in which the packets were placed in the container. The list is made visible, or available, from the work station. The sandwich maker counts the groups of packets from one end of the container until the group is reached based on the location of the sandwich name on the list.

One problem with the list or key, method is that: when one group of packets has been used up, the empty group is sometimes not counted and instead the next group is counted in its place, throwing the count off. The wrong sandwich can be inadvertently made and sold.

One method of keeping the groups of meat packets separated that has been proposed, is to use U-shaped flexible elements to support the packet groups within the U.

The bottoms of the U-shaped elements when filed with many meat packets ride upward as the U gets wider. This is disadvantageous as it is very important that the meat stay as close to the bottom of the container as possible so that it takes full advantage of the refrigeration provided by the work station.

In addition, the U-shaped elements tend to thermally insulate the meat packet groups from the refrigerated work station.

Another disadvantage with using the U-shaped elements is that the support elements and the tops of the U-shaped elements themselves protrude above the top of the container. This is disadvantageous because, at the end of a business day the container is removed from the refrigerated work station and placed in a conventional refrigeration unit, or refrigerator. Before putting it into the refrigerator the container is covered with plastic, or cellophane. In order to provide an airtight seal, with the plastic, the U-shaped elements must be removed prior to covering the container.

As many sandwich restaurants are constructed such that the customer can see the sandwiches being made, the appearance of the meat just before and while it is being put onto the bread, or into a roll, is very important. Known methods and devices allow the meat packets to sag when placed on their sides. Since the meat packets lack rigidity, they can not withstand the compressive forces exerted on them by their own weight. It has been shown that if the meat is spread out in its flattened state., it not only makes it easier to be placed onto a sandwich but has a more attractive and appetizing appearance.

SUMMARY OF THE INVENTION

The present invention overcomes the shortcomings of all of the methods and devices heretofore known by providing an improved method of, and device for, preparing sandwich meat for making sandwiches.

It is an object of the invention to provide a method which includes the steps of: placing a long thin pile of meat onto a separator sheet, including placing a first slice of meat onto the separator sheet: placing a second slice of meat onto the sheet partially overlapping the first slice; placing additional slices of meat onto the slices previously placed overlapping the previously placed slices; folding an uncovered portion of the separator sheet over the long thin pile of meat thereby substantially encasing the meat in the separator sheet and defining a meat packet. A packet filled with a similar meat or a preselected combination of meats defines a meat packet type. The meat packets each have a length a width and a thickness. A plurality of meat packets of similar type are placed in groups into a container. The entire group is then advantageously encased in a plastic or cellophane strip. The widths of the packets are arranged vertically, on edge, in the container. A rigid member having a width substantially equal to the width of the packets, and having a length substantially equal to the length of the packets is placed between groups of packets of similar meat packet type. The meat packets are arranged in the container such that the length of each packet is arranged horizontally and the width of each is arranged vertically.

The method according to the invention includes providing a container having sides which are closer together at the bottom of the container than at the top of the container thereby defining an angle. The rigid members have edges which define a similar angle such that the rigid members are kept from falling over in the container in a self-locking way.

It is another object of the invention to provide a method comprising the steps of minimizing the tendency of the meat packets to sag in the container by pressing the meat packets against an end wall of the container by pressing on one of the rigid member thereby imparting stress to the meat packets. The self locking of the rigid members tend to maintain the stress. The imparted stress, in turn, becomes a residual stress within the meat packets which presses against the rigid members.

It is a further object of the invention to provide a sequence of steps including: placing a plurality of meat packets flat and parallel against one of the end walls; placing a first rigid member having a width substantially equal to the width of the packets and having a length substantially equal to the length of the packets against the plurality of the first type of meat packet; applying a force against the first rigid member and releasing thereby imparting some stress to the plurality of first type of meat packet. Then arranging a plurality of a second type of meat packet in the container adjacent the first rigid insert, and placing a second rigid member adjacent the second type of meat packet group and applying a force to the second rigid member. The steps of arranging, placing, and applying are repeated with respective additional pluralities of meat packet types and rigid members until the container is filled.

It is still further object of the invention to include the steps of: removing a meat packet; moving the remaining meat packets by pressing one of the rigid member toward one of the end walls; and restoring at least partially the stress present before said step of removing the meat packet.

It is still another object of the invention to provide a plate member to be used as an aid in the preparation of sandwich meat in which a container having side walls is filled with groups of meat packets which are placed on edge within the container. The plate member has a front and back surface, a top, a bottom edge, a left edge and a right edge. The left and right edges extend upwardly from the bottom edge toward the top. The right and left edges define an acute angle with the apex of the angle being below the bottom edge. The plate member is positionable inside the container between the group of the first meat packet type and the group of the second meat packet type.

According to the invention the container side walls define an acute angle, and the angle defined by the edges is substantially similar to the angle defined by the container walls such that the edges fit within the container side walls.

It is a still further object of the invention to provide an inventive plate member having a rigidity, surface texture, and shape such that problems with prior art methods and devices are completely obviated. The plate member includes front and real surface which have a surface texture such that the waxed paper of the meat packet groups tends to cling to the front and back surfaces, due to, for example, electrostatic charge.

The cellophane may be eliminated. The meat packets encased in the waxed paper will then tend to cling to the plate member by a light adhesive force because of the moisture in the meat packets which tends to permeate the waxed paper.

The rigid member, or plate, is advantageously made from a good thermal conductor so that it contributes to the refrigeration provided at the bottom of the container, by conducting heat away from the meat. The rigid member can be made of a metal, and is advantageously made from stainless steel.

It is another object of the invention to provide a device which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
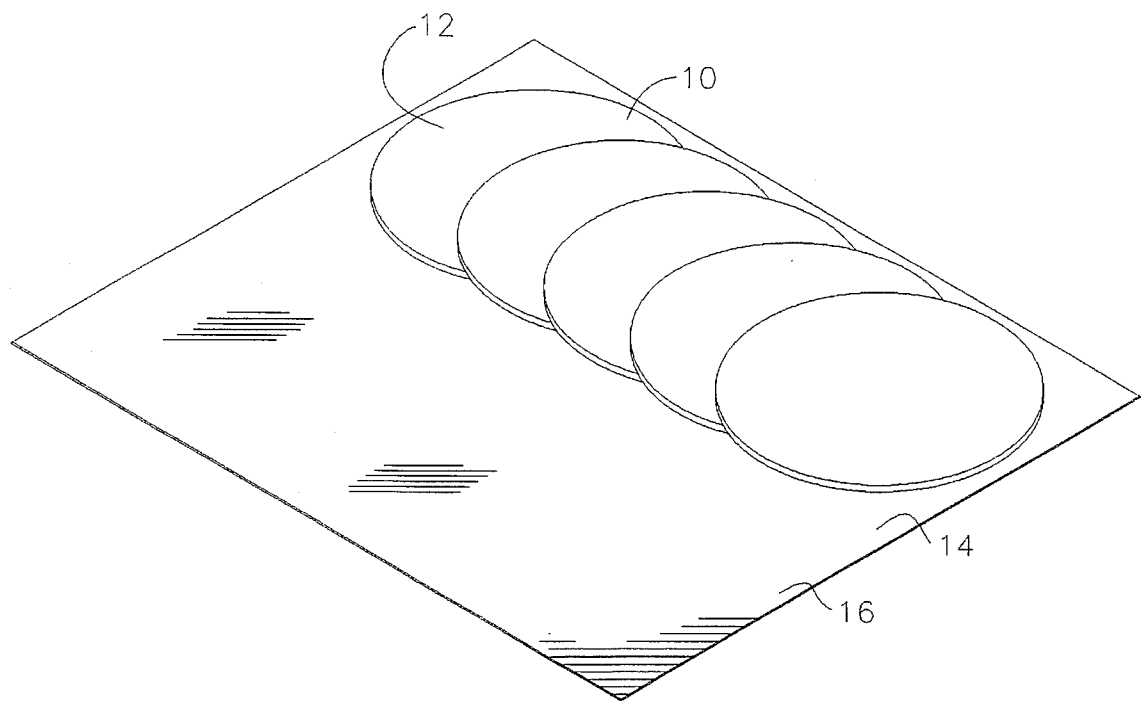
FIG. 1 is a perspective view of meat slices spread out on a waxed paper sheet according to the invention.
Figure 2:
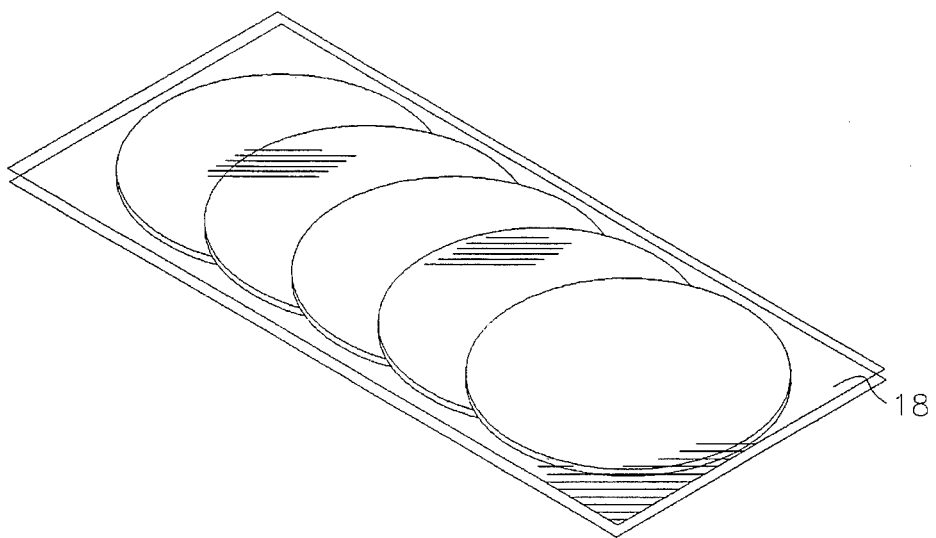
FIG. 2 is a perspective view of a meat packet.
Figure 3:
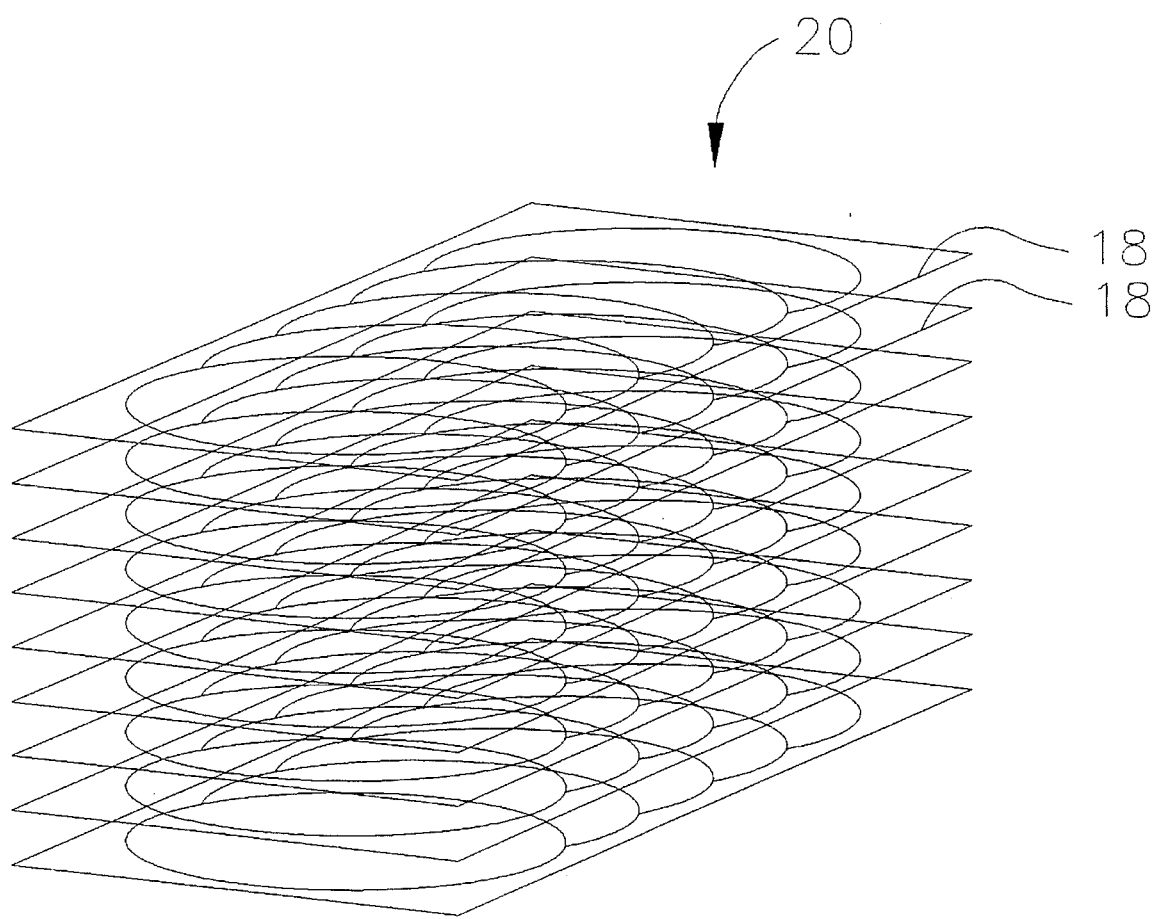
FIG. 3 is a perspective view of a meat packet group.

FIG. 1 show plurality of meat slices 10 spread out in a long pile 12 on a waxed paper sheet 14. The uncovered portion 16 of the sheet 14 is shown folded over onto the meat slices 10 thereby forming a meat packet 18 as shown in FIG. 2.

Figure 5:
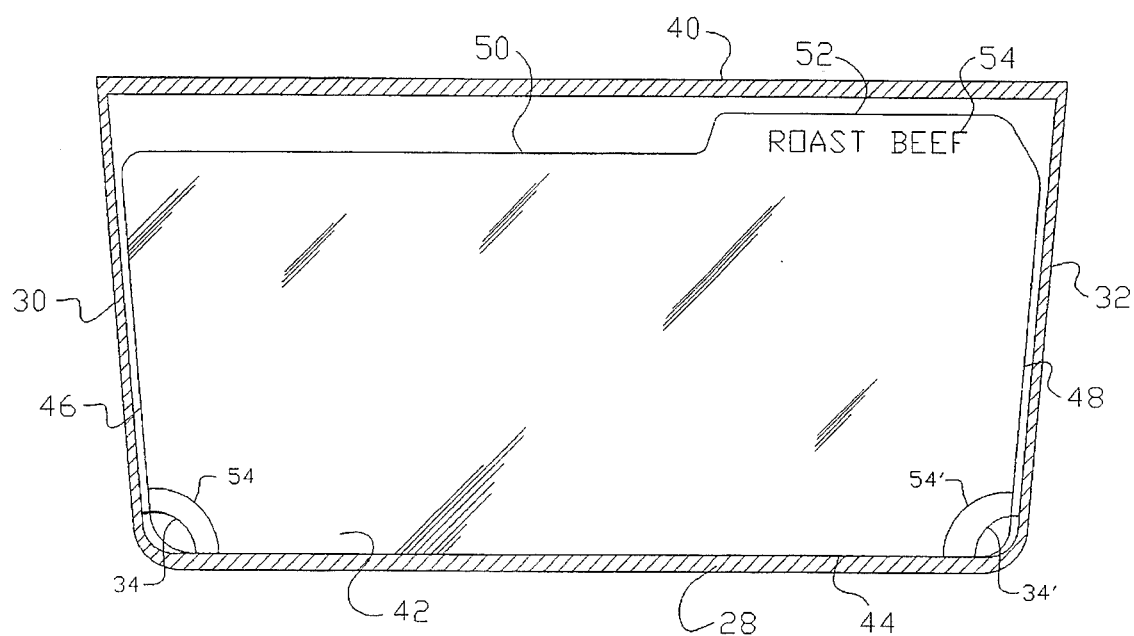
FIG. 5 is a cross-sectional view according to the invention.

FIG. 5 shows a group 20 of meat packets 18. Each of the packets 18 in the group 20 are of similar type. A cellophane sheet is wrapped around to encase the group of meat packets 20 but is not shown here for clarity.

FIGS. 4a, 4b, 4c, 4d, and 4e show how the meat packet groups 20 (i.e. packets 18 of similar type) are placed in a container 22 in a predetermined order according to the invention.

Figure 4A:
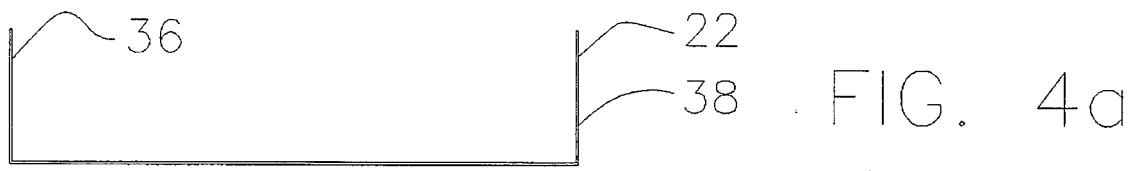
FIGS. 4a, 4b, 4c, 4d, 4e are cross-sectional views showing successive steps according to the invention.
Figure 4B:
Figure 4C:
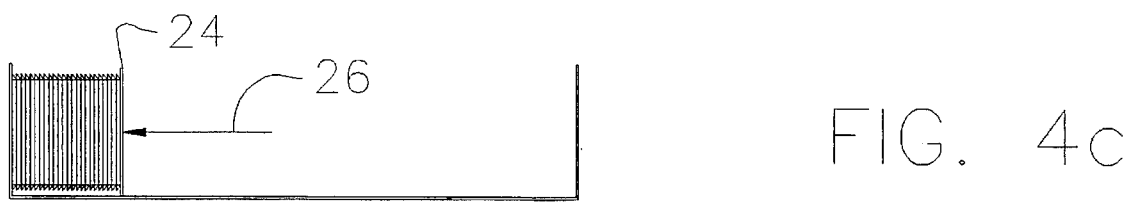
Figure 4D:
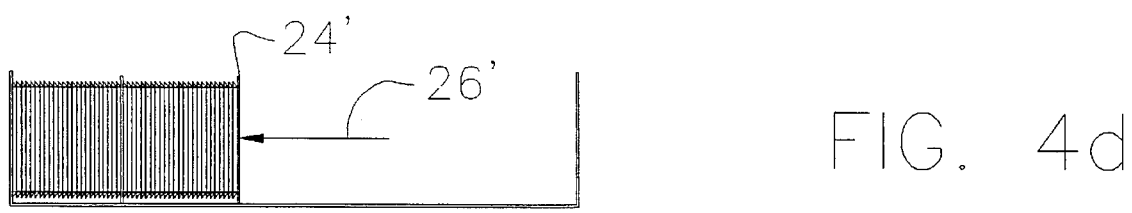

An empty container 22 is shown in cross-section in FIG. 4a. A group 20 of meat packets of similar type are placed in the container as shown in FIG. 4b. Next a rigid element 24 is placed in the container 22 adjacent the meat packet group 20, as shown in FIG. 4c. A force, as shown by arrow 26, is exerted on the rigid member thereby imparting stress to the meat and minimizing the tendency of the meat to sag in the packets 18. FIG. 4d shows how the steps previously taken, as shown in FIGS. 4b and 4c are repeated and an additional force 26' is imparted to the second rigid element 24'.

Figure 4E:
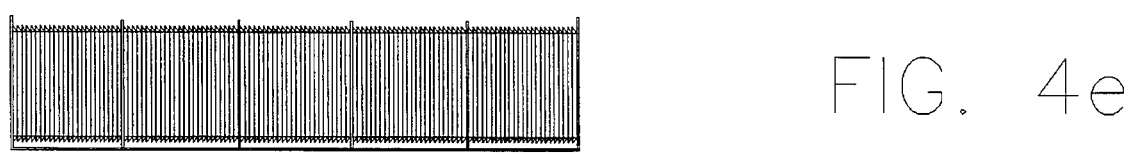

FIG. 4e shows the container filled with five groups of meat packets.

FIG. 5 is a cross-sectional view of the container showing the placement of a rigid insert member inside the container. The meat packets have been removed for clarity.

The container has a bottom 28, a first side wall 30 and a second side wall 32. The side walls 30 and 32 each define an angle 34 and 34' with the bottom 28 such that together they define an acute angle with the apex thereof well below the container. The container end walls 36 and 38 (see FIG. 4a) and side walls 30 and 32 terminate at a top edge 40.

The rigid insert 42 includes a bottom edge 44, side edges 46 and 48, and a top 50. The top 50 includes a tab portion 52 for receiving indicia 54 indicating a sandwich meat, or packet, type. Side edges 46 and 48 each define an angle 54 and 54' with the bottom edge 44 such that together they define an acute angle with the apex thereof well below the bottom edge.

Figure 6:
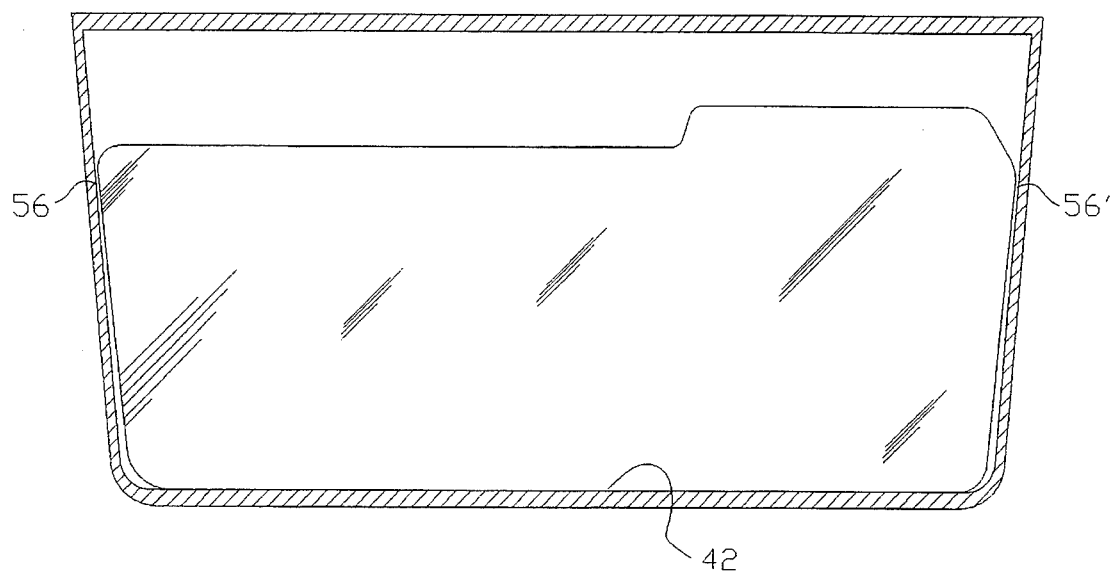
FIG. 6 is a cross-sectional view according to the invention.

The angles 54 and 54' are substantially similar to the angles 34 and 34'. As shown in FIG. 6 the rigid members are kept substantially upright in a self locking way in that the edges 46 and 48 come in contact with sides 30 and 32 at points 56 and 56'due to the angles 34, 34' and 54, 54'.

While a specific embodiment of the invention has been shown and described in detail to illustrate the application of the principles of the invention, it will be understood that the invention may be embodied otherwise without departing from such principles.

What is claimed is:

1. A plate and container arrangement to be used as an aid in the preparation of sandwich meat comprising: a plurality of plate members each having a front and back surface, a top, a bottom edge, a left edge and a right edge, the left and right edges extending upwardly from said bottom edge toward said top said right and left edges defining a first acute angle with the apex of said first angle being below said bottom edge, a container having a length and having opposing side walls, a front wall, a rear wall, and a bottom, said side walls defining a second acute angle being substantially similar to said first acute angle the apex of said second angle being below said container bottom, said plate members being positionable inside said container substantially perpendicular to said side walls said plate members being continuously adjustable along the length of said container, the plates defining storage spaces having a width defined as the distance between one of the container side wall and a plate, or two plates, the width being continuously adjustable from substantially no distance to substantially the length of the container less the thickness of the plates said plate members being supported substantially upright in a self locking manner by said container side walls, and said plate members being positionable between groups of meat packages the groups of meat packets being defined as a long pile of meat used to make a certain sandwich substantially encased in a separator sheet the meat packets being placed on edge within the container, said plate members having a tab member extending above said top such that said tab members can be viewed from above the meat packets said tab being disposed to receive indicia labels.

2. A plate member according to claim 1 wherein said acute angle defined by said edges is between 75° and 85°.

3. A device according to claim 1 wherein said plate member edges contact the container side walls when said plate member is allowed to partially tilt thereby keeping the plate member substantially upright.

4. A plate member according to claim 1 wherein the plate member is made from a material which is a good thermal conductor.

5. A plate member according to claim 1 wherein the plate member is a metal.

6. A plate member according to claim 1 wherein the plate member is made from stainless steel.

7. A plate and container arrangement according to claim 1 wherein said plate members are made from a good thermal conductor.

* * * * *